United States Patent
Faris

(10) Patent No.: US 6,643,001 B1
(45) Date of Patent: Nov. 4, 2003

(54) PATTERNED PLATELETS

(75) Inventor: Sadeg M. Faris, Pleasantville, NY (US)

(73) Assignee: Revco, Inc., Elmsford, NY (US)

( * ) Notice: Subject to any disclaimer, the term of this patent is extended or adjusted under 35 U.S.C. 154(b) by 0 days.

(21) Appl. No.: 09/196,583

(22) Filed: Nov. 20, 1998

(51) Int. Cl.$^7$ ................................................ G06K 9/74
(52) U.S. Cl. ............................ 356/37; 356/36; 356/300
(58) Field of Search ............................. 356/39, 36, 300, 356/71; 283/86, 91, 83

(56) References Cited

U.S. PATENT DOCUMENTS

| | | |
|---|---|---|
| 4,388,453 A | 6/1983 | Finkelmann et al. |
| 4,637,896 A | 1/1987 | Shannon |
| 5,242,617 A | 9/1993 | Metzger et al. |
| 5,362,315 A | 11/1994 | Muller-Rees et al. |
| 5,364,557 A | 11/1994 | Faris |
| 5,500,313 A | 3/1996 | King et al. |
| 5,506,704 A | 4/1996 | Broer et al. |
| 5,514,296 A | 5/1996 | Chen et al. |
| 5,599,412 A | 2/1997 | Faris |
| 5,691,789 A | 11/1997 | Li et al. |
| 5,697,649 A * | 12/1997 | Dames et al. .................. 283/83 |
| 6,207,770 B1 * | 3/2001 | Coates et al. .................. 526/63 |

FOREIGN PATENT DOCUMENTS

WO  WO98/12265  3/1998

* cited by examiner

*Primary Examiner*—Frank G. Font
*Assistant Examiner*—Roy M Punnoose
(74) *Attorney, Agent, or Firm*—Steven E. Kahm; Ralph Crispino

(57) ABSTRACT

Patterned platelets are platelets made with specified shapes and sizes. The various sizes and shapes of the platelets are used to code articles and substances to which they are applied. The patterned platelets can be in inks or paints applied to articles. The platelets can be further coded by markings thereon or by spectral or polarization codes rather than just the distribution of sizes and shapes. The patterned platelets can be made from any materials buy subtractive or additive processes. A patterned platelet can also be made by an actinic polymer being applied to a substrate and a mask applied to allow only the desired size and shape to be exposed to radiation curing the unmasked portion of the polymer on the substrate. The polymer can be cholesteric liquid crystals with the properties of reflecting polarized light of selected wavelengths to code the crystals in addition to the size and shape codes. The cholesteric liquid crystals may also be doped with materials which absorb a portion of the wavelengths which would otherwise be reflected further coding the patterned platelets. Codes of the patterned platelets can be composed of the distribution of the platelets alone or in combination with the position of the platelets on an object. A code with the presence or absence of a specified patterned platelet in a specified location could be a binary code. If n different patterned platelets are used in each of x positions a code with x to the nth power combinations is possible.

6 Claims, 5 Drawing Sheets

PATTERNED PLATELETS

BACKGROUND OF THE INVENTION

1. Field of the Invention

This invention relates to patterned platelets. More particularly the invention relates to platelets having specified shapes, sizes and optical properties, optionally with markings thereon, such that the platelets can be applied to objects to tag and identify the objects with unique codes. The platelets can be pigments in inks or paints applied to an object. The platelets can also be mixed in with other materials to tag them such as in liquids or solids.

2. Description of the Related Art

Counterfeiting of articles and documents has been a problem in the past. Further, it is also useful in many industries to be able to trace of the origin of goods and documents. In the past, many methods have been introduced to tag articles such that they can be easily and positively identified in the future and to prevent tampering or counterfeiting activities. Some of these methods including using flop colors and holograms on platelet pigments. For example, the recently issued U.S. currency has flop colors.

Presently most platelet pigments are made in sheets or films and then broken into random sized fragments buy various techniques such as sand grinding, ball milling, two roll milling, pestle and mortar or freezing and cracking. These fragments are then sieved by screens or wet sieving or air classification to sort the sizes of the fragments. However the shapes of the fragments are random and the size of the fragments has a wide standard deviation. Further, the various sieving steps add to the cost of processing the platelets.

Marking of platelets of even size and shape was not used to identify those platelets and use the platelets in codes to help identify articles and substances and deter counterfeiters.

One recent development was to make controlled shape and size platelet pigments by molding polymers as shown in patent WO98/12265 however the molding process is difficult to use, wastes a lot of expensive material and is costly. Another drawback is removing odd shaped, notched or angled pieces from the mold.

Patterned platelets, having controlled shapes and sizes, have not been coded by spatial features, such as raised or lowered portions of the patterned platelets with identifiable shapes on the platelets or spectral features, such as color and polarization, to deter counterfeiters.

Low cost, easy to make, coded platelets, which can be easily applied to articles or documents such that they are easily detected are needed.

Three dimensional shaped patterned platelets have not been used in the past. Three-dimensional platelets add more possibilities for coding with more shapes and the shapes may be useful for reflecting or refracting light.

Low cost, easy to make, coded platelets, which can be mixed into liquids and solids to identify them are needed. The platelets can be used in inks and paints applied to objects to identify the objects.

Most prior art Cholesteric Liquid Crystal (CLC) pigments are made by actinic methods on sheets of material. The sheets are then broken up into fragments of random sizes and then sieved to obtain particles of approximately the same size and to eliminate platelets which are too small. This process results in a lot of wasted materials which are costly to make.

It will be appreciated that prior art platelet pigments cannot cost effectively produce the ultra-narrow size distribution, have not taught low cost easy to make the production of platelets with regular shapes, and they have not taught how pigments can be endowed with markings or codes using spatial marks, polarization or spectral marks.

SUMMARY OF THE INVENTION

This invention relates to producing platelets, which have a uniform shape and size. Platelets produced with a uniform size do not have to be sieved, the resulting standard deviation in the size of the platelets is smaller than the platelets produced with random sizes and then sieved. When platelets are produced with a small standard deviation of size, codes comprising mixes of several sizes of platelets in various percentages can be made for tagging objects.

Similarly when distinct shapes of platelets are made, they can be applied to objects, to tag those objects. For example, a mix of 50% circles and 50% squares can be one code. The letters B, K, Y could be another code. A mix of numbers, letters and shapes could be yet another code. Any combinations unique to a product can then identify that product when platelets using that code are applied to or embedded in the product.

In addition to the size and shape of the platelets, platelets can also be made with spatial markings, either raised or lowered portions, on the platelets such as having letters or shapes etched on the platelets. The platelets can also have apertures in the platelets or notches on the perimeter of the platelets to further distinguish them and make them more useful for tagging.

The platelets can also be made to reflect distinctive portions of the spectrum of light to further identify the platelets for tagging purposes. Each platelet can have one or more sections of its surface reflect different spectral codes. CLC platelets can be made to selectively reflect wide or narrow bands of light. For example, platelets can be made to reflect red or green or blue or white light or even light not in the visible spectrum. A platelet can have one section reflect green right circularly polarized light and another section reflect blue left polarized light. The light reflected can be used to easily identify the platelets used. Patterns of colors of light reflecting pigments can be used to further code the platelets. By using dopant materials in the CLC platelets, spectral band absorbing identifiers can be placed in the platelets further coding the platelets to be used as tags.

The sizes, shapes and spatial markings on the platelets can be made by masking when an actinic process of CLC production is used.

Other techniques for producing specified shapes and sizes of platelets include the use of masking by screen printing, masking by ink jet printing, gravure printing, chemical etching, ablating, and laser cutting methods all of which are well know in the art. Any additive or subtractive methods used for making the patterned platelets, either alone or in some combination, are within the scope of the invention. To make three dimensional shaped patterned platelets stereolithography methods of adding and subtracting layers of material may be used.

OBJECTS OF THE INVENTION

It is therefore an object of this invention to provide platelets having predetermined regular shapes.

Another object of this invention is to produce platelets having substantially identical lateral dimensions or areas, resulting in a very narrow platelet size distribution.

Another object of this invention is to provide platelets with substantially identical sizes and shapes in two or three dimensions.

Another object of this invention is to reduce the cost of producing pigments by eliminating milling and sieving steps.

Another object of this invention is to eliminate production of platelets outside a desired range, thus reducing waste.

Another object of the invention is to produce patterned platelets without using expensive hard to use molds.

Yet another object of this invention is to provide platelets of known size and shape in combinations of different sizes and or shapes to form codes used for tagging objects.

Yet another object of this invention is to provide platelets of known size and shape having spatial markings on the platelets for additional identification codes.

Yet another object of the present invention is to provide platelets of known size and shape having identification codes created by means of polarization or spectral encoding.

Yet another object of this invention is to provide platelets for general printing and in particular, security printing wherein the platelet shape, size spatial, spectral and polarization encoding identifies the origin of the ink.

It is a further object of the invention to provide codes wherein inks or paints with coded platelets are placed in specified locations on a product thus forming another code.

It is yet another object of the invention to provide optical properties in the three dimensional shaped:patterned platelets.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1A:
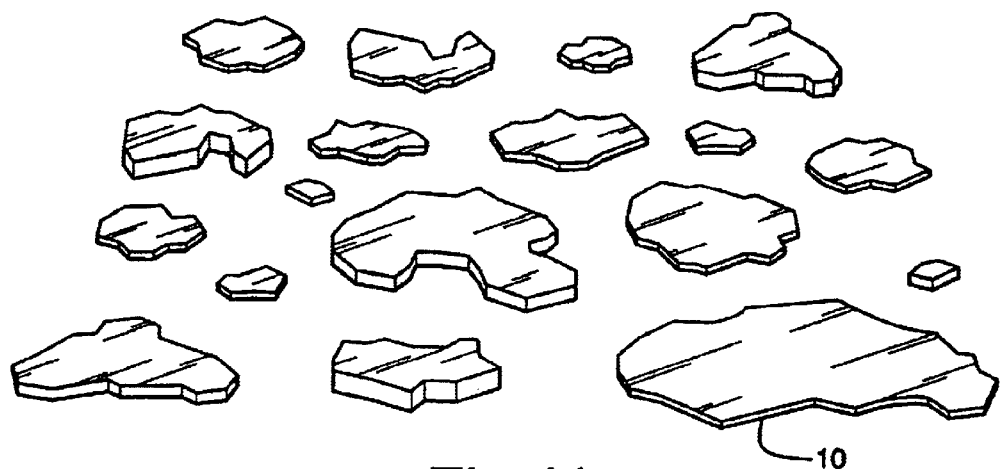
FIG. 1A is an illustration of prior art platelets having random shapes and sizes.

The prior art, such as in U.S. Pat. Nos. 5,415,950, 5,500,313 and 5,362,315, teach methods of producing platelet pigments 10 which have random sizes and random shapes as illustrated in FIG. 1A. These platelets 10 are made by making color producing thin films coated on large substrates. These color films are then removed from their substrates and broken into smaller fragments. Several milling steps are used to produce yet smaller fragments, flakes or platelets having thickness ranging from about 1 micron to about 20 micron and lateral dimensions ranging from about 3 microns to about 1,000 microns. Platelets are defined as flat structures with lateral dimensions at least a factor 2 larger than the average thickness, preferably more than 5 times larger than the average thickness. This ensures that when the platelets are applied to a substrate they will lay flat. As defined herein, patterned platelets, as used in this invention, are on the order of about 1 micron to about 1000 microns laterally.

Figure 1B:
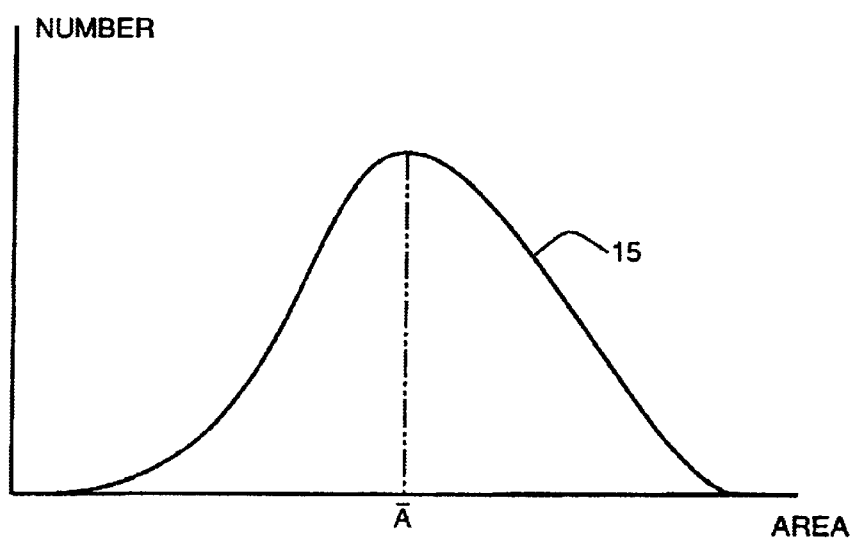
FIG. 1B shows a size distribution curve representing a large number of platelets having different shapes and sizes as shown in FIG. 1A.

In order to sort the platelet sizes and to achieve a desired size range of size distribution, the prior art, in the patents listed above, use sieving steps. For example, standard mesh 200 has 76 $\mu$m openings. Milling and sieving steps have to be repeated to achieve the desired size range or distribution. These sieving and milling steps lead to a mean area or size distribution which is illustrated by curve 15 in FIG. 1B, which is difficult and costly to make narrow. The material that is much smaller than the mean size is discarded because it would lead to degraded color properties or because its particles have an aspect ratio about or less than 2 and may not be considered flat platelets. Therefore, the prior art process achieves either a relatively broad mean area distribution, which compromises the quality of the pigment, or a relatively narrower distribution which requires more costly steps, and the need to discard material outside the desired distribution. Prior art platelets and methods of producing them suffer from these limitations.

Shaped platelets have been made as shown in patent WO 98/12265, which discloses a method of making shaped platelets by molding. The process is not easy to use, is expensive and does not show how to add spatial or spectral makings on the platelets. Further, it is not practical to mold patterned platelets with notches or other angled shapes because of the difficulty in removing such platelets from the mold. In addition, the molding process shown does not disclose the ability to make three dimensionally shaped patterned platelets. The molding process shown also wastes a lot of expensive material increasing the cost of the molded patterned platelets.

Figure 2A:
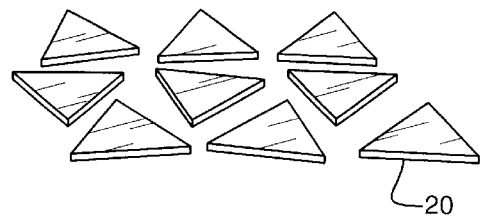
FIG. 2A is an illustration of groups of platelets each having the same size and the same triangle shape.
Figure 2B:
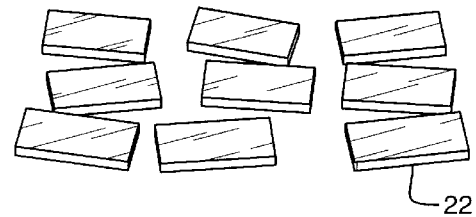
FIG. 2B is an illustration of groups of platelets each having the same size and the same rectangle shape.
Figure 2C:
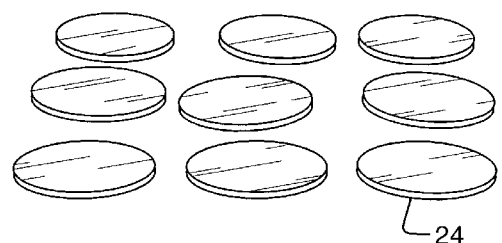
FIG. 2C is an illustration of groups of platelets each having the same size and the same circular shape.
Figure 2D:
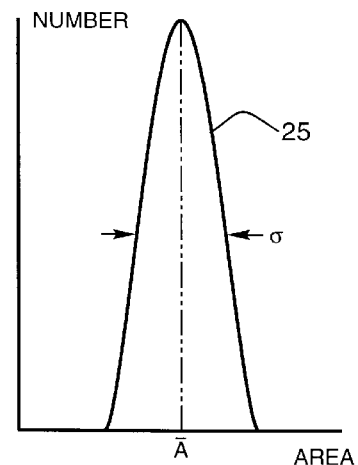
FIG. 2D shows a size distribution curve representing a group of platelets all having the same shape and size. It can also represent different shapes but identical mean area A.

The present invention overcomes these limitations by producing patterned platelets which, are easy to make, can be make in three dimensions, and the process of making the patterned platelets does not waste material. Further, the patterned platelets of the present invention have spatial makings and/or spectral markings, in addition to the well-defined shapes and sizes. With well-defined shapes and sizes of platelets being produced, repeated milling and sieving steps are eliminated and wasted material is avoided. This reduces the production cost. The mean area of the platelets is illustrated by curve 25 in FIG. 2D. FIG. 2F shows a comparison of curves 15 and 25 illustrating the smaller standard deviation of mean area using the platelets made to a specified size and shape as opposed to the milling and sieving process of the prior art.

With regular shapes and sizes of platelets, coding by various combinations of shapes and sizes becomes possible. FIGS. 2A–C show three representative groups of platelets, triangular 20, rectangular 22, and circular 24 respectfully. It is understood that other shapes, letters, numbers or other configurations for the platelets are possible. In each group, as shown in FIGS. 2A–C the platelets have substantially the same lateral dimensions and the same area. This leads to a very narrow size distribution as illustrated in FIG. 2D. This distribution has a mean area, $\overline{A}$ of the platelets with a standard deviation $\sigma$ such that $\sigma/\overline{A}<<1$. A mixture of platelets can be produced from different groups of shapes having substantially the same areas. Thus a code comprising $\frac{1}{3}$ triangles, $\frac{1}{3}$ rectangles and $\frac{1}{3}$ circles all having the same mean area $\overline{A}$, can be produced to tag an object. The percentages of the shapes can be changed to create another code.

Figure 2E:
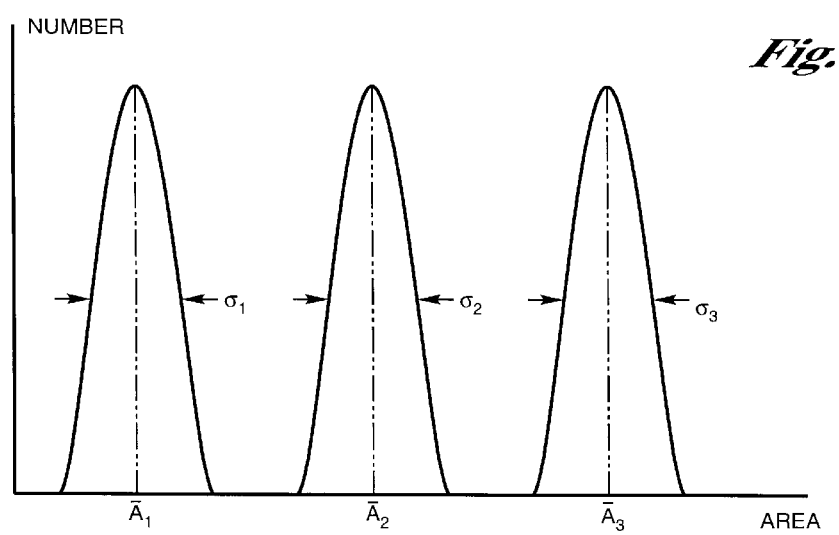
FIG. 2E is an illustration of narrow size distributions of a mixture of platelets having identical shape but different mean areas $A_1$, $A_2$, and $A_3$. It can also illustrate a mixture of different shapes and different mean areas $A_1$, $A_2$, and $A_3$.
Figure 2F:
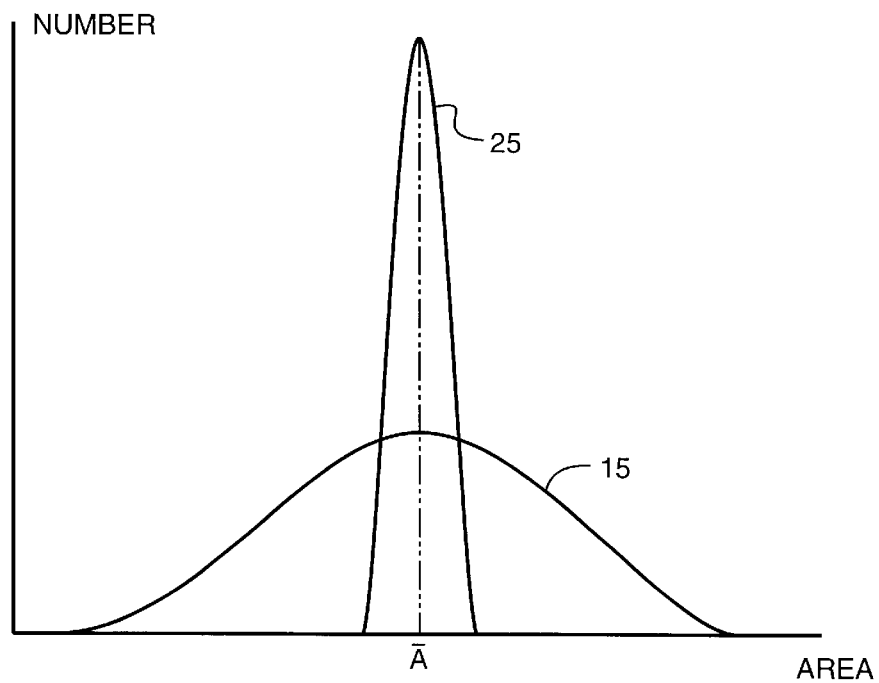
FIG. 2F is an illustration comparing the standard deviation of flake sizes made by prior art methods of fracturing and sieving to the present method of producing platelets of uniform size.

FIG. 2E illustrates a mixture of platelets having identical shapes, for illustration lets pick all rectangles, but having a different narrow size distribution, with mean areas and standard deviations, $\overline{A}_1, \overline{A}_2$, and $\overline{A}_3$, $\sigma_1, \sigma_2, \sigma_3$, respectively. The code for the platelets is now $\frac{1}{3}$ rectangles of mean area $\overline{A}_1$, $\frac{1}{3}$ rectangles of mean area $\overline{A}_2$, and $\frac{1}{3}$ rectangles of mean area $\overline{A}_3$. The code can easily be changed by changing the percentages of rectangles found in each mean area grouping such that 10% is in $\overline{A}_1$, 30% in $\overline{A}_2$, and 60% in $\overline{A}_3$. Other codes can be made up using different shapes or combinations of shapes in each mean area grouping. Thus, hundreds of different combinations of codes are possible with only three shapes and three sizes with all the percentages of mixes changing. Obviously more shapes and sizes can be used in combination for more codes.

With well-controlled shapes and sizes of platelets, etchings or apertures in the surface of the platelets can spatially further distinguish the identity of the patterned platelets making counterfeiting even more difficult and expanding the number of codes possible.

Figure 3A:
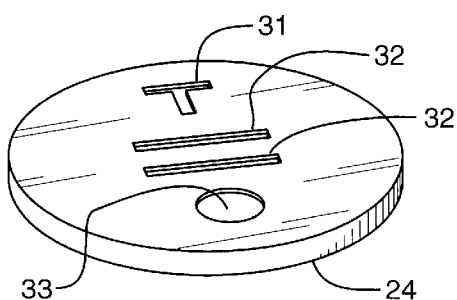
FIG. 3A is an illustration of a circular platelet having added spatial markings or codes inside its boundary.

As illustrated in FIG. 3A, circular platelet 24, has a T 31 etched on its surface, it also has two bars 32 under the T and a circle 33 under the bars. Thus, the circle platelet 24 has a unique spatial marking or etching on it to further identify it. A new code with circles having a T, two bars, and a circle etched on it of a specified size is now possible. The spatial markings could be apertures in the circle 24 instead of etchings on the surface thus providing another distinguishing feature for yet another code. The spatial markings could also be raised areas on the patterned platlets.

Figure 3B:
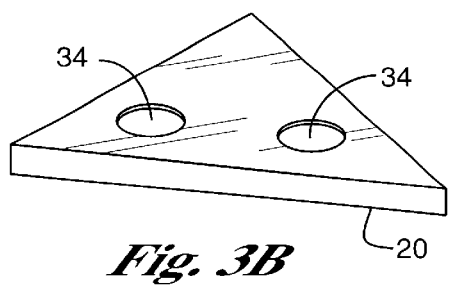
FIG. 3B is an illustration of a triangular platelet having added spatial markings or codes inside its boundary.

Similarly FIG. 3B shows triangle 20 with circles 24 etched on its surface.

Figure 3C:
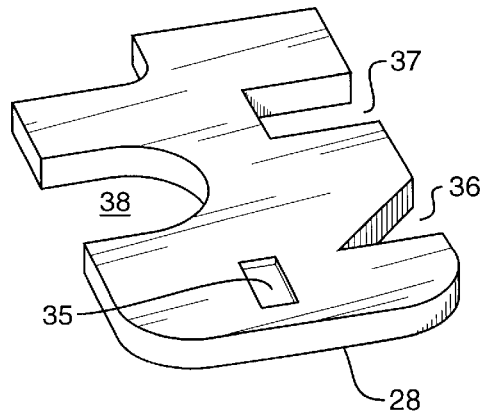
FIG. 3C is an illustration of a platelets having added spatial marking or code inside or on the boundary.

FIG. 3C shows an irregular shape 28 with a V shaped notch 36 in the perimeter, a square notch 37 in the perimeter, and a U shaped notch 38 in the perimeter. The irregular shape 28 has a rectangle 35 etched on it to further uniquely identify it and thwart counterfeiters.

In addition to the size and shape combinations listed above the platelets may also have different spectral coding such as colors. Thus, another code can be red triangles of mean area $\overline{A}_1$ blue rectangles of area $\overline{A}_2$ and green circles of mean area $\overline{A}_3$. The combination of colors with sizes and shapes and percentages now makes many more combinations of codes possible.

A further distinguishing feature is having more than one spectral marking on a patterned platelet's surface. Thus for example in FIG. 3B the triangle 20 could have circles 34 of the same or different colors or polarizations, which would further code the platelets. Many other combinations of spatial and spectral markings are possible on the platelets.

Figure 4A:
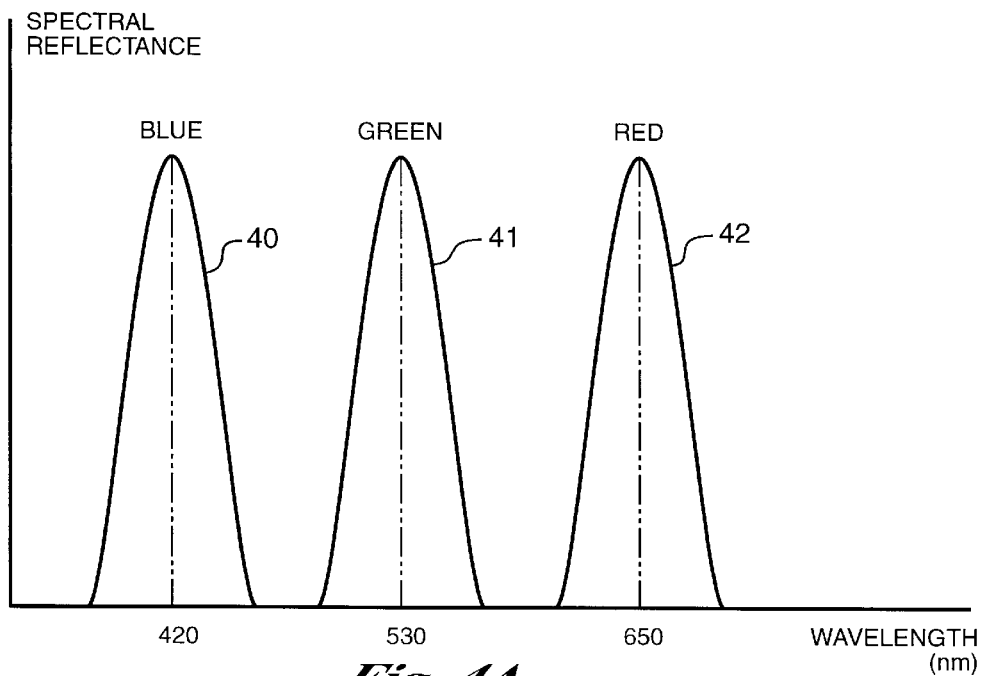
FIG. 4A shows representative spectral curves showing the reflectivity of platelets for red, green and blue wavelengths of the incident electromagnetic radiators.

The colors can be obtained by pigments which absorb colors or by pigments which reflect colors. FIGS. 4A to 4D show spectrums from reflective cholesteric liquid crystals CLC which can make up the platelets. The CLC materials can be made to have sharply defined reflective spectra as shown in FIG. 4A. The colors are distinct with no overlapping reflected wavelengths. As shown the platelets can now be spectrally coded by color with blue, red, green or any other color in addition to size and shape.

Figure 4B:
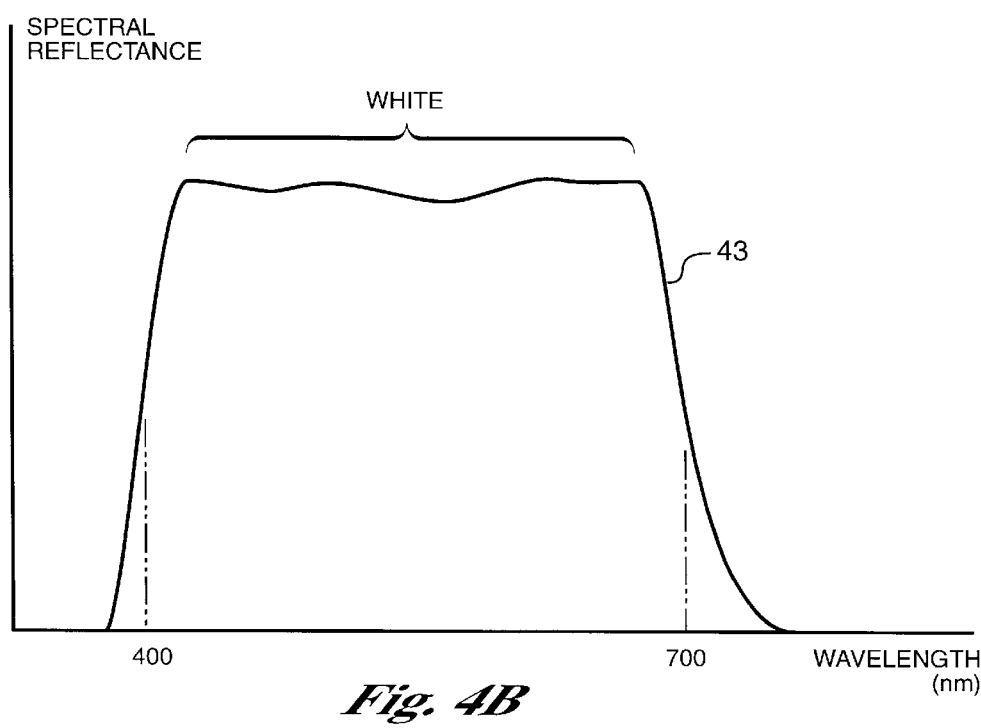
FIG. 4B shows a representative spectral curve showing the reflectivity of platelets for white wavelengths of the incident electromagnetic radiators.
Figure 4C:
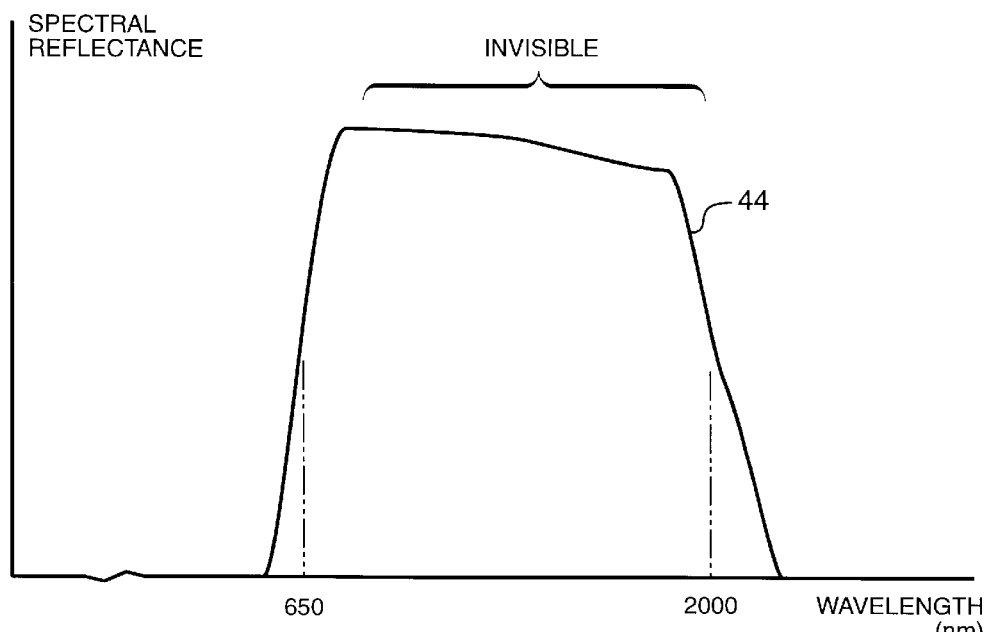
FIG. 4C shows representative spectral curves showing the reflectivity of platelets for invisible wavelengths of the incident electromagnetic radiators.
Figure 4D:
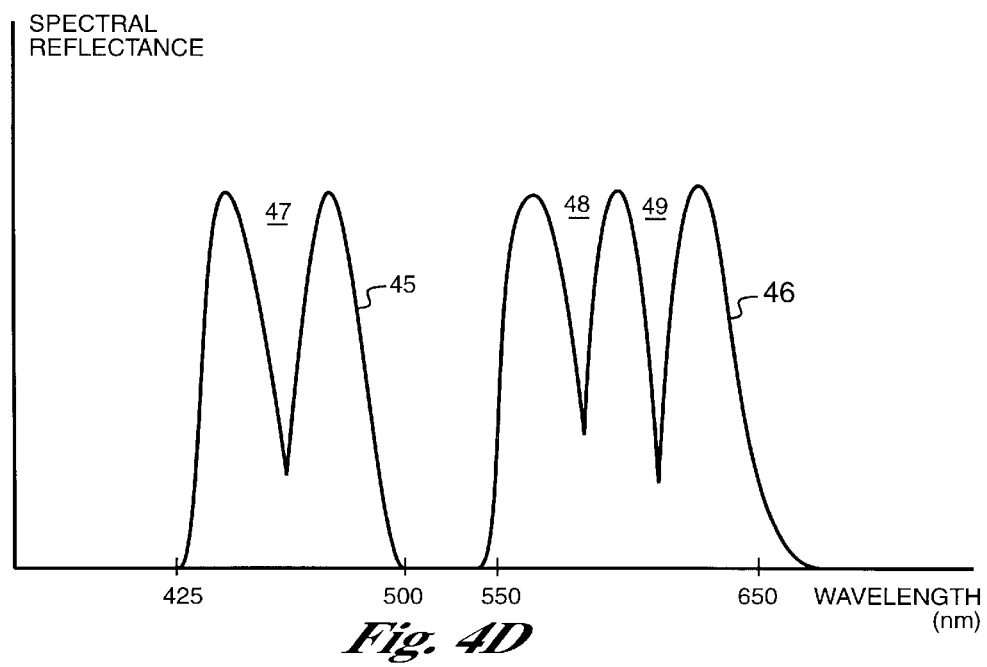
FIG. 4D shows the reflectivity curve of platelets for different wavelengths on which narrow absorption bands are superimposed representing a spectral marking or coding.

CLC materials can also reflect white light as shown by the reflective spectra in FIG. 4B or reflect invisible portions of the spectrum as shown in FIG. 4C. The spectra can be easily detected and analyzed to help identify the code used by simply shining a light on the object having the spectrally coded platelets and observing the light reflected therefrom. When CLC reflective materials make up the platelets a dopant can be added to the CLC to absorb a portion of the light that would ordinarily be reflected. As shown in FIG. 4D this further spectrally codes the platelets and prevents counterfeiting.

Other optical properties such as polarization can be used to help identify the CLC platelets. CLC platelets circularly polarize light such that either a right handed or left handed light will be reflected.

Other color characteristics such as pearlescence, iridescent colors, flop colors (colors which change with the viewing angle) and metallic luster can further optically identify a platelet.

A code of platelets with a wavelength observable at a particular viewing angle is another variable which can be added to the mix of combinations of codes.

Another code can be to have a row or matrix with a large number of spaces for inserting numbers, letters, shapes, or coded patterned platelets with different identifying spatial spectral or polarization markings in there assigned positions. The code being the presence or absence of the expected coded patterned platelets in each position. For example if a line having 64 positions was used the presence or absence of the various shapes of patterned platelets in their assigned spaces would simulate a 64 bit line of computer code. When the position can contain the correct platelet or no platelet the system is binary. When the system can have lets one of x different shapes, with different spatial makings or different spatial markings a code with a number equal to, x to the 64th power, combinations is possible. The amount of information carried is such a system is very large. A large number of lines of such codes not only would secure a document against counterfeiters but could carry large amounts of information in a small space.

As shown above an almost infinite number of combinations of shapes, sizes, etchings, notches, apertures, colors, and spectra absorbing dopants can be used in such combination as to uniquely identify any object by the platelets used thereon or therein. Colors can be mixed to any desired hue. Colors can be obtained by additive primaries (red, green, blue) or subtractive primaries (cyan, magenta, yellow). The colors can be flop colors, pearlescent colors, or iridescent colors. The colors may be obtained by CLC materials, or by holographic or interference techniques.

Other identifying characteristics of the patterned platelets may be their magnetic or static electricity properties which will help to magnetically or electrically separate or detect the patterned pigments. For example a magnetic ink may be made with the patterned pigments such that a magnetic ink reader can be used as part of the tag identifying process.

Patterned platelets can be made by a large variety of methods and by using a large variety of substances either alone or in combination. The materials may be in one layer or stacked in many layers. The patterned pigments may be flat or layered in three dimensional shapes such as prisms or spheres or cubes. The patterned platelets may have reflective surfaces as one layer on one or more surfaces of the patterned platelet. The patterned platelets may have shapes combined with reflection or refraction properties used in optics such as parabolic reflectors, prisms, mirrors, lenses, diffraction gratings, spherical reflectors.

For example a thin sheet of aluminum can be cut, etched, or ablated to leave well-defined shapes and sizes of aluminum. Similarly a substrate can be masked by such techniques as silk screening, gravure printing or inkjet printing and aluminum deposited on the substrate to form the shapes and sizes of the patterned pigments. Layers of other materials, pigments (reflective or absorptive) may be applied to have multilayered or stacked platelets. Many techniques are known for depositing or removing materials in precise fashion. Any of these techniques may be employed for use with this invention. Stereolithographic techniques can be used to make three-dimensional patterned platelets with three dimensional shapes.

Examples of techniques for depositing material are electroplating and vapor deposition.

Examples of techniques for removing materials include etching, ablating, use of solvents to remove material.

For additive methods of making patterned platelets a substrate is prepared, and a thin film of a substance is added by painting, or depositing the substance through a mask or stencil of the desired shape. The substance is then fixed, dried cured or otherwise adhered and the process repeated for other layers of the same or different substances until all desired layers are added. The same or different masks may be used for each layer. For three dimensional shapes different masks can be used for each layer to form the desired shape. The various layers added may apply spatial or spectral markings to the platelets. The patterned platelets are then removed from the substrate and are the correct size and shape for immediate use without having to use milling or sieving steps to obtain the correct sizes needed.

For subtractive methods a thin film of material is deposited on a substrate and a mask or a defined pattern is applied. The mask can be applied by a photo resist, photo lithography, ink jet printing, gravure printing, silk screen printing or other methods. the unprotected areas of the material are then etched, ablated or otherwise remove material from the unprotected area. The mask can then be removed and a different mask applied if further material form a different area is to be removed. In this manner layers may be separately removed to form a three dimensional shape or to form patterned platelets with notches, apertures, or spatial markings on their surfaces.

Any combination of additive and subtractive steps may be used to produce patterned platelets with the desired combinations of spatial markings and spectral or polarized markings thereon.

Using well-known techniques layers of materials may be built up to tailor the patterned pigments to specific uses. Magnetic materials may be used as a sole material or as a layer to make the patterned pigments magnetic for magnetic separation or sorting or for magnetic reading.

Hydrophobic or hydrophilic layers may be added to attract or repel water or to have the platelet attracted to or repelled by water.

The materials used to make the patterned platelets can be organic or inorganic, They may be edible inert materials added to foods or medicines or biodegradable materials so as not to harm the environment.

The platelets can be made of high temperature metals so as to survive heating without losing their shapes and can survive fires without the codes breaking down. Heat resistant platelets can be imbedded in a high temperature metal, which in turn is imbedded in another material to survive fires or other high temperature environments.

The platelets can be added to carriers for inks and paints and then used in standard ink or paint applications to print on objects or coat objects. The platelets can be made small enough to be used in ink jet printers, pens or other applicators with small apertures without clogging the apertures.

A protective layer may be added to the patterned platelet to prevent rust or preventing solvents, acids or bases from destroying the patterned platelets. Various dyes, pigments, holograms, interference patterns, polarizers and other materials may be added to the patterned pigment as shown above to code the patterned pigment for use in tagging object.

The patterned platelets can be used in inks for printing documents where security to prevent counterfeiting in important, such as currency, stock certificates, bonds, checks, notes or other commercial paper. These coded inks or patterned platelets can be used on goods such as compact discs, video tapes, software disks, packaging material, coupons, airline tickets, lottery tickets or any number of goods.

A further coding means is to print with inks having coded platelets wherein different portions of the object being printed have different coded pigments. For example the top right hand corner may have circular and square platelets of two sizes each platelet having one or more spatially or spectrally distinctive markings on it. The center of the object may have printing with a different ink having platelets with a different code such as all pink triangles in 3 sizes. A line on the left side of the object can have notched circles with three colors on each platelet. Thus, a combination of the shape and area printed and the code of the platelets in each area is another code.

The patterned platelets with colors can be used in inks or paints. The inks or paints when applied to objects identify the objects by the codes in the inks or paints and by the position of those codes on the object.

Patterned platelets can be encased in plastics, mixed in papers, or other substances, which are later to be authenticated. To authenticate the substances samples are taken, the patterned pigments are separated out or searched for to determine the code and authenticate or identify the product so coded.

Patterned platelets can be made from inert materials for consumption in foods, drugs, or drinks.

Patterned platelets can be added to substances such as munitions or other chemicals to identify the maker, batch number or other data by the patterned pigment code used.

Patterned platelets can be added to solids or liquids to identify them and prevent counterfeit goods made with these tagged materials from being sold.

Materials or substances can be made entirely of patterned platelets.

To identify the article with coded platelets on or in it or a substance with the coded platelets in it a sample of the platelets must be examined. A means of looking at the platelets can be with a visual aid such as a microscope for a human to evaluate the platelets and determine the code used, or a machine aided observation and detection method can be used. For example if an ink containing the coded platelets is printed on the surface of an object a magnifying device connected to a scanner or charge coupled device can make bit maps or pixelized pictures of the platelets, a pattern recognition program in a computer can then detect the sizes shapes and spatial codes of the patterned platelets. Spectrum analyzers and polarization detectors can identify the polarizations and colors of the patterned platelets and determine the count of each type of platelet to match it to a code. A picture of the bit map or pixelized picture can be viewed by a human on a screen or by printing the image. The information can be stored electronically or on paper.

If the platelets are encased in a product the platelets would have to be nondestructively removed from the substance spread out and then examined as shown above. If for example the platelets are in a material which can be crushed and broken up, the platelets can be separated from the material and examined. If the platelets are in a material which can be dissolved or melted at a temperature that will not destroy the platelets, the platelets may be separated by those means. In the case of the platelets being in a substance which is a liquid the platelets may be centrifuged out or the liquid evaporated to obtain the platelets for examination. Many other means of collecting the platelets for examination are possible.

As an aid to observing the platelets the platelets may be coated with florescent materials which will aid in observing the platelets when the platelets are exposed to ultraviolet light or some other wavelength. The platelets may alternatively reflect light at a frequency which is easily detected by a charge coupled device.

One class of patterned platelets are those made from cholesteric liquid crystals (CLC). CLC is used here as an example and is not meant to limit the substances which patterned platelets can be make from. CLC has been selected as an example because it is easy to make patterned platelets of designated shapes, sizes, colors, polarizations, and having dopants for spectral identification using CLC materials.

The properties of cholesteric liquid crystals (CLC) are described in detail in U.S. Pat. No. 5,364,557, U.S. Pat. No. 5,599,412, U.S. Pat. No. 5,221,982 and U.S. Pat. No. 5,691,789, which are made a part hereof and incorporated herein by reference, and summarized below:

1. CLC films assume a helical configuration with a helical axis perpendicular to the film surface.
2. CLC films reflect selectively a portion of the spectrum $$\frac{\Delta \lambda}{\Delta \lambda_0} = \frac{\Delta n}{\overline{n}}$$

where $\Delta n$ is the birefringence, $\lambda_0 \overline{\lambda 0}$ $\overline{n}P$ $^n P$is the center wavelength, $\overline{n}$ is the average index of refraction and P is the helical pitch.

3. The CLC film is a circular polarizer, reflecting left-handed light ($P_1$) if the helix is left-handed, and reflects right-handed light ($P_2$) if the helix is right-handed.
4. Different colors are produced by varying the helical pitch, P, by means of varying the concentration of chiral dopants.
5. The width of the reflected spectral band of the incident electromagnetic radiation can be varied from about 20 nm to 2000 nm in the visible or infrared regions of the spectrum, by creating a pitch that varies across the thickness of the film.
6. The CLC color effects are produced by a reflection mechanism.
7. Platelet pigments have been made by fragmenting CLC films.
8. In order to obtain the CLC phase represented by the helical configuration, alignment means is required which results from special treatment of the substrate and superstrate (optional) and by other external means.

The CLC platelets according to the above references can have representative spectral characteristics shown in FIGS. 4A–D. In FIG. 4A, the red, green and blue reflection spectra of 3 platelets are shown. Depending on the chiral doping and by imparting a non-linear pitch distribution taught in U.S. Pat. No. 5,691,789, it is possible to obtain polarizing white pigments as illustrated in FIG. 4B, reflecting the visible portion of the incident electromagnetic radiation (from 400 nm to 700 nm). It is also possible to obtain invisible pigments which reflect incident electromagnetic radiation having wavelengths longer than 650 nm, as illustrated in FIG. 4C. Absorptive dopants can be added to the CLC material, before or after CLC film formation, which results in a spectral "marking" or "coding" as shown in FIG. 4D. Curve 45 shows that in addition to the primary spectral characteristics, another spectral mark 47 representing the absorption of a dopant. Curve 46 shows the two other spectral marks 48 and 49 representing other absorptive dopants. Many rare earth compounds produce narrow absorption characteristics when mixed in host materials. Other dyes or pigments with narrow absorption bands may be used as spectral markings. A plurality of narrow spectral markings can be superimposed on the primary spectrum of the platelets can be used as a novel encoding means of platelets.

It is well known in the art that CLC films, holographic film and multi-layer interference films can exhibit polarization characteristics, namely, they can be made to reflect on polarization state $P_1$ and transmit the other polarization state $P_2$. Platelets can be made which reflect $P_1$ and $P_2$, or reflect unpolarized light in the case of notch filter platelet, which is made of a laminate of two identical layers which reflect $P_1$ and $P_2$ identically.

U.S. patents U.S. Pat. Nos. 5,364,557; 5,599,412; 5,363,315; and 5,242,617; 5,691,789; 5,506,704; 4,637,896; 4,388,453; 5,514,296; and the applicant's co-pending applications Ser. Nos. 8/787,282; 8/891,877; Ser. Nos. 08/739,467; 8/898,658; 8/739,467; 8/890,320 teach about CLC materials and methods of producing CLC platelets. These patents and patent applications are hereby made a part hereof and incorporated herein by reference.

One method producing patterned platelets with CLC materials uses the following steps:

1. Preparing a CLC mixture comprising components chosen from:
    a) at least one polymerizable CLC monomer; chosen from the polyester liquid crystal family, specifically acrylate or methacrylate materials b) At least one cross-linkable oligomer chosen from the polysiloxan family
c) A cross-linked nematic liquid crystal material with a
d) Left-handed or right-handed chiral dopant
e) Non-polymerizable low molecular weight nematic liquid crystal
f) A photo initiator
g) Appropriate solvent to vary the viscosity
h) Polymerization inhibitor
i) Absorptive dopants for spectral markings 2. Preparation of the surfaces of substrates and optionally superstrates to give them the ability to align the CLC films so as to achieve a helical configuration with a helical axis substantially perpendicular to the CLC film. Substrate materials can be chosen from polyester, PET, PVA, Teflon™, polycarbonate, and other substrates. The surface treatment could be rubbing the surface in one direction to orient the liquid crystal or natural orientation of the substrate surfaces which occur by appropriately stretching said substrates in one direction. The substrates and superstrates can also be prepared such that the surfaces facilitate alignment as well as release of the CLC films. In this case, the substrates and superstrates can be recycled (reused) after removal of the CLC films. It is also possible the surfaces can be coated by a layer of photo-alignable material that preferentially aligns the molecules in response to a linearly polarized UV radiation.

3. Pre-heating the CLC mixture to achieve the LC phase and an appropriate viscosity.

4. Removing air bubbles, especially oxygen, by placing the mixture in a chamber that enables pumping out (by a vacuum pump) the residual air.

5. Coating the substrate with the CLC mixture to achieve a uniform thickness ranging from about 1 micron to about 50 microns. This coating process is accomplished in an atmosphere devoid of oxygen, which is known to inhibit or slow down polymerization. Coating is accomplished by well-known knife-coating, reverse roller coating, die casting, extrusion, and the like. These coaters are equipped with a heating means which keeps the substrate and mixture at an appropriate uniform temperature.

6. Laminating a superstrate on the coated film is an optional step.

7. A means of providing shearing forces and an annealing means to ensure that the CLC mixture has nearly perfect alignment in the CLC phase. In the CLC mixture may have components which respond to magnetic or electric fields. In this case, auxiliary magnetic as electric alignment means may be optionally provided. It may also be possible to impact ultrasonic forces to substrates, superstrates and CLC layer to provide the alignment forces necessary to achieve the CLC phase.

8. Patterning means to define the shape of the CLC platelets on the laminate while simultaneously imparting spatial markings on said platelets. This step is obtained at essentially no additional cost because it is incorporated in the essential UV curing (polymerization or cross-linking) step. This curing step involves irradiating the laminate with an appropriate intensity of UV radiation for a period ranging from several seconds to tens of minutes. A mask is used through which the laminate is exposed with UV radiation for curing purposes. This mask defines the CLC platelet shapes as well as the spatial markings and codes as described above. A series of masks may be used to build up a three dimensional patterned platelet. Masking with additional masks can add spatial markings by additive or subtractive processes.

9. Removing the superstrate, if there is one employed, exposing the first CLC film.

10. Repeating Steps 5–9 using another CLC mixture which reflects the second polarization state and a another mask to define the polarization encoding pattern described above.

11. Removing the second superstrate if Step 10 was necessary.

12. Removing the patterned and cured CLC film from the substrate. This is accomplished by means of scraping the film from the substrate facilitated by cooling to liquid $CO_2$ temperature. Since only the cured films are rigid on the substrate they are easily separated from the non cured CLC materials which can be reused.

Obviously many modifications and variations of the present invention are possible in light of the above teachings. It is therefore to be understood that, within the scope of the appended claims, the invention may be practiced otherwise then as specifically described.

What is claimed and desired to be secured by letters patent of the united states is:

1. A coded patterned platelet comprising:
    a non-molded platelet having a well-defined geometric or irregular shape, a specified surface area and one or more specified identification markings thereon.

2. A coded patterned platelet as in claim 1, wherein:
    one or more specified identification markings are selected from the group consisting of spatial markings, spectral markings, or polarization markings on the coded patterned platelets.

3. A coded patterned platelet as in claim 2, wherein:
    one or more spatial markings are selected from the group consisting of geometric shapes, numbers, letters, irregular shapes, notches, and apertures.

4. A coded patterned platelet as in claim 2, wherein:
    one or more spectral markings are produced by materials selected from the group consisting of dyes, Cholesteric Liquid Crystals, doped Cholesteric Liquid Crystal materials, holographic materials, refractive materials, reflective materials, and metallic materials.

5. A patterned platelet identity code for use with articles or substances comprising:
    a plurality of non-molded patterned platelets having any combination of n well defined geometric or irregular shapes with m specified surface areas where n and m are integers with a value of 1 or greater.

6. A patterned platelet identity code for use with articles or substances as in claim 5 wherein:
    the identity code is further defined by one or more markers selected from the group consisting of the percentage distribution of n sizes and m shapes of patterned platelets, spectral codes, polarization codes, spatial codes position on the article codes and angle of observation codes.

* * * * *